F. MÜLLER.
METHOD OF MAKING MILLING CUTTERS.
APPLICATION FILED DEC. 26, 1918.
1,348,299.
Patented Aug. 3, 1920.
2 SHEETS—SHEET 1.
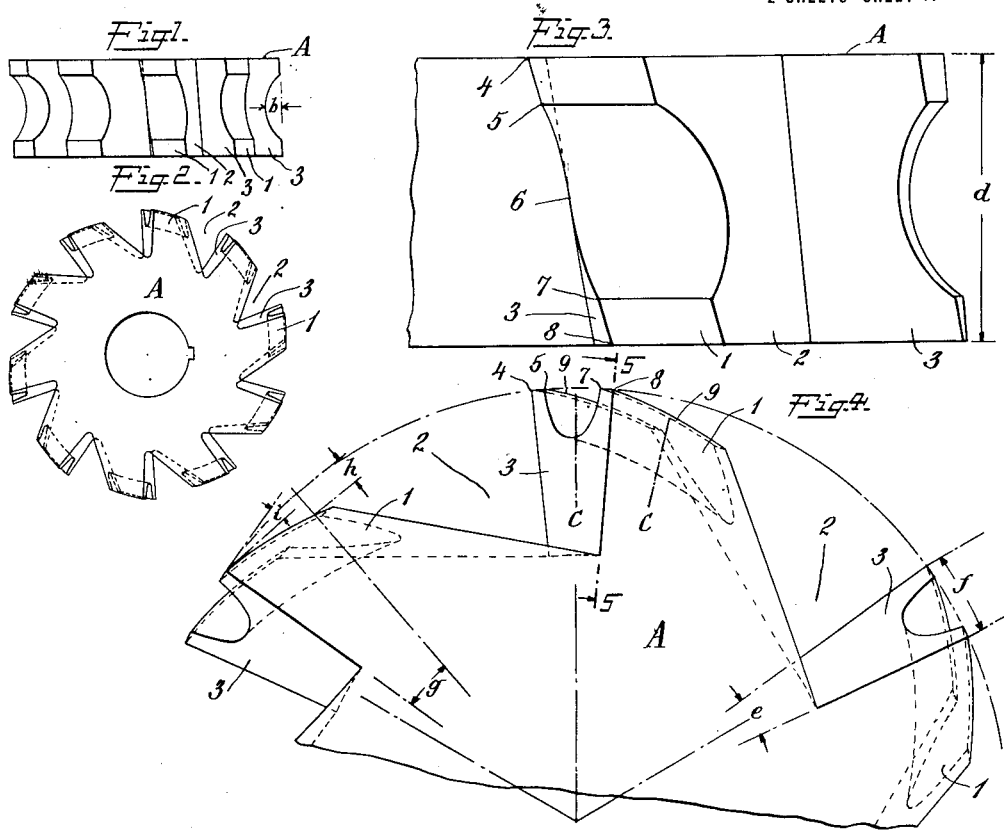
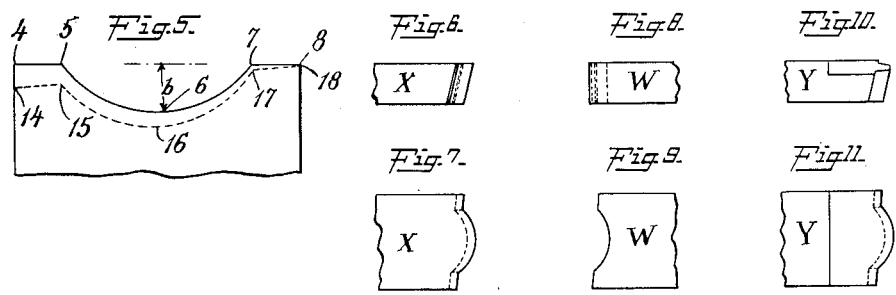
Inventor
Friederich Müller
By S. Jay Teller
Attorney F. MÜLLER.
METHOD OF MAKING MILLING CUTTERS.
APPLICATION FILED DEC. 26, 1918.
1,348,299.
Patented Aug. 3, 1920.
2 SHEETS—SHEET 2.
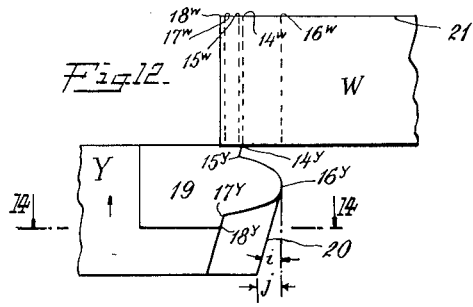
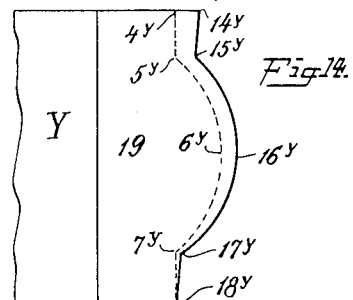
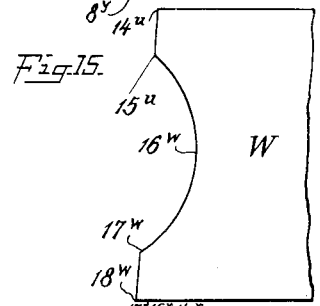
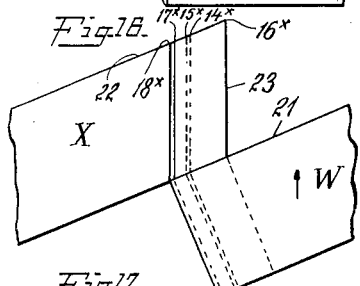
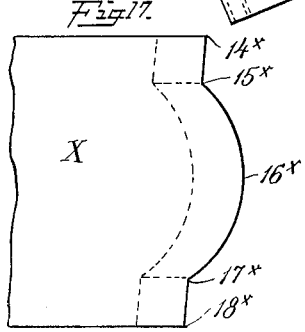
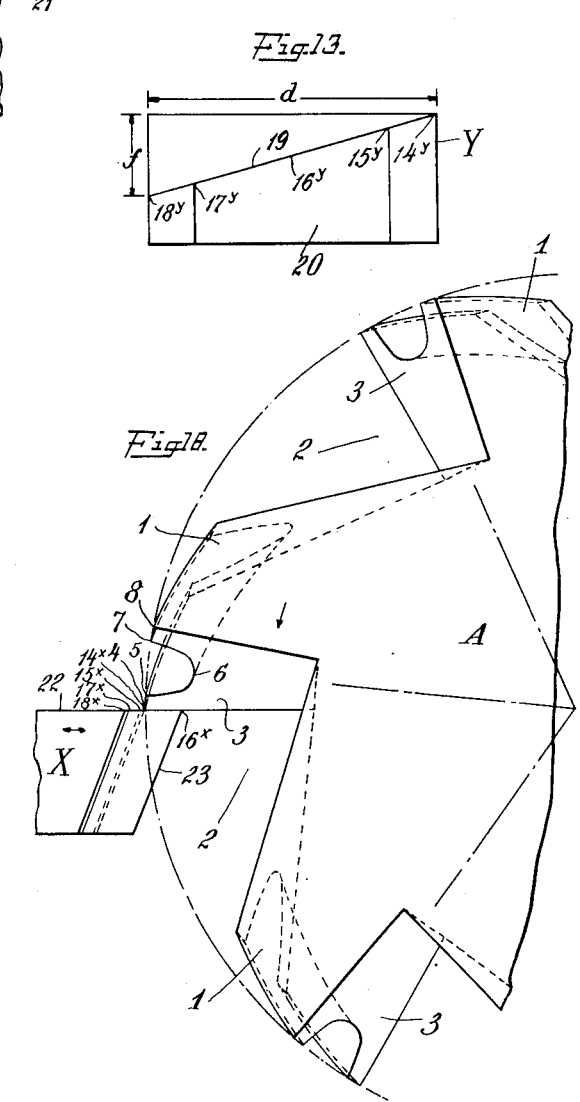
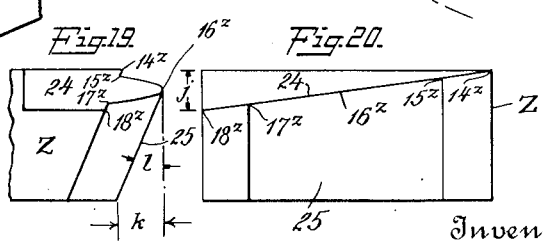
Inventor
Friederick Müller
By S. Jay Teller
Attorney

UNITED STATES PATENT OFFICE.

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

METHOD OF MAKING MILLING-CUTTERS.

1,348,299.   Specification of Letters Patent.   Patented Aug. 3, 1920.

Application filed December 26, 1918. Serial No. 268,353.

*To all whom it may concern:*

Be it known that I, FRIEDERICH MÜLLER, a citizen of the United States, residing at Hartford, in the county of Hartford and State of Connecticut, have invented certain new and useful Improvements in Methods of Making Milling-Cutters, of which the following is a specification.

It is a well known principle in the art of cutting metals that the cutting edge of the tool should preferably be inclined with respect to the direction of relative movement so as to effect a shearing cut. This inclination is of advantage in that it improves the cutting action and it is also of advantage in that it permits the tool to engage the work gradually and with relatively little shock instead of engaging it suddenly with greater shock. This principle has been applied to relieved milling cutters which are of uniform diameter throughout and has also been applied to milling cutters having a uniform taper from one end to the other. These milling cutters have their cutting edges longitudinally inclined with respect to the axis, the cutting edge usually approximately conforming to a helix. Thus each tooth is enabled to engage the work gradually and to effect a shearing cut.

I have applied this principle to accurately made and properly relieved formed or contour cutters. By a formed or contour cutter I mean one in which the diameter varies from end to end in ways differing from a uniform taper, the cutting being thus adapted to cut a predetermined contour other than a straight line. Prior to my invention it had not been deemed practical or possible to make such cutters with inclined cutting faces. The said invention is presented and claimed in my copending application for milling cutters, Serial No. 268,349, filed on even date herewith.

In my copending application for methods of making milling cutters, Serial No. 268,350, filed on even date herewith, I have presented a method of making cutters embodying the invention presented in my said application, Serial No. 268,349, and I have also shown several variations of the said method or alternate ways of practising it. In the present application I set forth and specifically claim one of the alternate forms of the said method presented in my application Serial No. 268,350. The method herein set forth is under some circumstances preferable to the method presented in the said application Serial No. 268,350 as being the one ordinarily preferred.

In order that the method may be clearly understood, I have shown in the accompanying drawings a cutter embodying the invention set forth in the aforesaid application Serial No. 268,349. It will be understood, however, that the drawings are for illustrative purposes only and are not to be construed as defining or limiting the scope of the invention, the accompanying claims being relied upon for that purpose. It will be particularly understood that the contour of the cutter shown has been selected merely by way of example and that any practical contour may be substituted for that illustrated.

Of the drawings:

Figures 1 and 2 are plan and end views respectively of a formed milling cutter such as may be made in accordance with the invention.

Figs. 3 and 4 are enlarged fragmentary diagrammatic plan and end views respectively of the milling cutter shown in Figs. 1 and 2. In these views there is shown a smaller number of teeth and the inclination of the cutting faces and the relief are increased in order to bring out the principles of the invention more clearly.

Fig. 5 is a diagrammatic view illustrating certain features of the cutter shown in Figs. 3 and 4.

Figs. 6 and 7 are side and plan views respectively of a lathe tool which may be used for cutting the final milling cutter shown in Figs. 1 and 2.

Figs. 8 and 9 are side and plan views respectively of an intermediate tool which may be used for making the lathe tool shown in Figs. 6 and 7.

Figs. 10 and 11 are side and plan views respectively of a preliminary reciprocatory cutter or tool which may be used for cutting the intermediate tool shown in Figs. 8 and 9.

Figs. 12 and 13 are enlarged diagrammatic side and end views respectively of the reciprocable cutter shown in Figs. 10 and 11. In these views the inclination of the cutting face and the relief are increased as in Figs. 3 and 4. Fig. 12 also illustrates the intermediate tool shown in Figs. 8 and 9.

Fig. 14 is a diagrammatic plan view illustrating certain features of the tool shown in Figs. 12 and 13.

Fig. 15 is a plan view of the intermediate tool on the same scale as Fig. 12.

Fig. 16 is an enlarged diagrammatic side view illustrating the intermediate tool in use for cutting the lathe tool.

Fig. 17 is a plan view of the lathe tool on the same scale as Fig. 16.

Fig. 18 is an enlarged diagrammatic side view illustrating the lathe tool in use for cutting a final milling cutter.

Figs. 19 and 20 are enlarged diagrammatic side and end views respectively of a preliminary tool differing somewhat from that shown in Figs. 12 and 13.

In order that the method may be clearly understood I will first describe a cutter such as can be made in accordance with the invention. Referring particularly to Figs. 1 to 5 of the drawings, it will be seen that I have shown a cutter A which is shaped to cut a predetermined contour differing from a straight line. The cutter is provided with a plurality of generally longitudinal teeth 1 between which are grooves 2, the teeth and grooves being preferably spaced uniformly. The grooves 2 between the teeth can be of any usual or preferred depth and shape, as required by the spacing and by the depth of the contour to be cut. The front wall 3 of each tooth 1 constitutes the cutting face thereof and this cutting face is radial or approximately so in order to provide a satisfactory cutting angle. Each cutting face 3 is inclined or positioned obliquely so that its longitudinal lines lie at angles to the axis of the cutter. Preferably, each tooth 1 is generally helical in form and each cutting face 3 conforms to a helicoid. As illustrated, the helicoid is one formed by a generatrix following the axis of the cutter and also following a helix on a cylinder concentric with the axis thereof, the helicoid in this case being radial. The teeth and the cutting faces may be inclined in either direction and the degree of inclination may be varied as required.

The cutter may be made for cutting any desired practical contour. The contour may be made up of a series of straight lines, or a series of circular arcs, or a combination of circular arcs and straight lines, or the contour may consist in whole or in part of non-circular curves. The cutter shown is adapted for cutting a contour consisting of straight end portions and a convex central portion conforming to a circular arc and having a height $b$. It will be understood that this particular contour has been selected merely by way of example and that the contour can vary in any practical way that may be desired, the method being particularly applicable however for making a cutter having a curved contour.

The outer edge of each cutting face 3 has an outline which is adapted to cut the predetermined contour when the cutter is rotated, this outline of the cutting face following the helicoidal surface thereof. In other words the outer cutting edge of each face is of such form that the projection of the said edge about the axis of the cutter upon an axial plane of intersection is the same as the predetermined contour to be cut. This will be more clearly understood from the diagrammatic views in Figs. 3 and 4. For the particular contour illustrated, the four points 4, 5, 7 and 8 on the outline of the cutting face are all at equal distances from the axis of the cutter; the central point 6 is at a distance from the axis which is less by the distance $b$; and all other points along the outline are at their respective correct distances from the center so that when the cutter is rotated they will define the correct predetermined contour, as shown by full lines in Fig. 5. This relationship of the several points along the outline of the cutting face obtains notwithstanding the fact that the cutting face is a warped or helicoidal surface.

Each tooth of the cutter is relieved along lines 9 extending backward and inward from the outline of the cutting face, these relief lines forming a continuous surface or continuous surfaces which extend from end to end of the cutter. The relief lines are properly constructed notwithstanding the variations in radius at different points along the said outline and notwithstanding the variations in angular position resulting from the warped or helicoidal cutting face. Preferably the relief lines 9 are maintained in similar relationship to each other as they extend backward and inward, the lines conforming to spirals of Archimedes. The result is that each tooth of the cutter, at any axial plane of intersection, such as 5—5, has a distorted shape, as shown by dotted lines in Fig. 5. This distorted shape includes points 14, 15, 16, 17 and 18 corresponding respectively to the points 4, 5, 6, 7 and 8 on the outline of the cutting face. The distortion of shape results from the fact that the successive inward inclined relief lines 9 start at different angular positions because of the inclined or helicoidal cutting face. Therefore with the cutting face inclined in the direction illustrated the several points 17, 16, 15 and 14 to the left of the point 8 or 18 are spaced inward from the respective points 7, 6, 5 and 4 by progressively increasing distances. Notwithstanding this distortion in shape at an axial plane of intersection, the outline or effective contour at the cutting face is correct, as before stated.

When the relief lines 9 conform to spirals and are maintained in similar relationship as they extend backward and inward, as is preferred, it is possible to sharpen or grind the teeth of the cutter on the front cutting faces 3 without changing the effective contour. The teeth present the same effective contour at successive inclined surfaces of intersection similar in form and position to the initial cutting faces 3. At any surface, such as c—c, back of an initial cutting face 3 and similar to the said face, the same effective contour will be found. Therefore if the teeth are ground on their front faces to helicoids which are the same as the helicoids of the initial cutting faces the effective contour will remain the same.

Each cutting face of the cutter A has a certain degree of inclination which is represented by the ratio between a unit of length measured parallelly with the axis and longitudinally of the contour and the angular advance of the cutting face corresponding to the said unit of length. For different cutters the actual angles of inclination with respect to the axis may differ because of different diameters but the degree of inclination, as defined above, may remain the same. For the cutter A as illustrated in Figs. 3 and 4 the length $d$ of the cutter may be taken as the unit of length, and it will be seen that the corresponding angular advance is represented by $e$. The actual linear advance of one end of the cutting face with respect to the other is represented in Fig. 4 by $f$.

Each tooth of the cutter A has a certain degree of relief which is represented by the ratio between the angular advance of the cutter and the corresponding decrease in radius. In the case of spiral relief, the relief lines for the same degree of relief must always conform to similar spirals constructed about the center. For different cutters the actual angles of relief may differ because of different diameters but the degree of relief, as defined above, may remain the same. For any angle such as $g$ of the cutter A the decrease in radius or the amount of clearance, is $h$. The relief lines 9 meet the circuferential lines at an angle such as $i$.

Taking up now the method of making the milling cutter, it will be understood that the preliminary steps of turning the blank, cutting the grooves therein, etc., can be carried on in any usual or preferred way, these not of themselves constituting any part of the present invention. The invention relates particularly to the method of shaping the blank to provide a distorted shape which will enable it to cut a correct contour.

In accordance with the general method set forth in my aforesaid copending application, Serial No. 268,350, the shape of the cutter to be made is formed by means of a preliminary cutter which may be either a milling cutter or a reciprocatory tool. As set forth in the said application Serial No. 268,350 and as set forth and also claimed in my copending application for method of making milling cutters, Serial No. 268,352, filed on even date herewith, the preliminary cutter, whether a milling cutter or a reciprocable tool, may be used to form a lathe tool adapted to cut the final cutter. The present application relates specifically to the method involving the use of the reciprocable preliminary cutter.

Figs. 6 and 7 show a lathe tool X such as may be used for cutting the final cutter A; Figs. 8 and 9 show an intermediate tool W such as may be used for cutting the lathe tool, and Figs. 10 and 11 show a reciprocable preliminary cutter Y such as may be used for making the intermediate tool W.

The tool Y is adapted to be reciprocated along straight lines, as indicated by the vertical arrow in Fig. 12. At a plane such as 14—14 transverse to the lines of reciprocation, the tool has a shape which is the same as the predetermined contour to be cut by the final cutter A. This is shown by dotted lines in Fig. 14 in which the points $4^y$, $5^y$, $6^y$, $7^y$, and $8^y$ correspond respectively to the points 4, 5, 6, 7 and 8 of the cutter A, as shown in Fig. 5. The top face 19 of the tool is inclined, a shown in Fig. 13. The front face 20 of the tool is also beveled or inclined, as shown in Fig. 12, to provide the required relief.

The top face 19 of the tool Y has a degree of inclination which bears a predetermined ratio to the degree of inclination of the cutting face of each tooth of the final cutter A. In the case of a reciprocable tool, the degree of inclination is represented by the ratio between a unit of length measured longitudinally of the contour and transversely of the lines of movement and the amount of rise corresponding to the said unit of length and measured parallelly with the lines of movement. Any convenient degree of inclination may be selected but I have shown a degree of relief the same as that of the cutter A. Taking the width $d$ of the tool as the unit of length it will be seen that the corresponding amount of rise is $f$, which is the same as the advance or rise for the cutter A at the outside radius thereof.

The front face 20 has a degree of relief which bears a predetermined ratio to the degree of relief of the final cutter. In the case of a reciprocable tool, the degree of relief is represented by the ratio between a unit of length measured parallelly with the lines of movement and the corresponding amount of clearance. If the degree of relief is the same as for the final cutter, as shown, the degree of relief is also the same. Inasmuch as the rise $f$ for the tool Y is the same as the advance or rise for the cutter A at the outside radius, the front face is given an amount of clearance which is the same as that of the cutter A at the outside radius thereof. In other words the tool is given a relief angle $i$ which is the same as that of the cutter A at the outside radius thereof. The corresponding clearance for the tool is $j$. As the result of the intersection of the inclined cutting face 19 with the inclined front face 20, the outline or contour of the cutting face 25 is distorted as shown by full lines in Fig. 14. This distorted contour has points $14^y$, $15^y$, $16^y$, $17^y$, and $18^y$, all points $17^y$, $16^y$, $15^y$ and $14^y$ beyond the point $8^y$ or $18^y$ being spaced outward from the respectively corresponding points $7^y$, $6^y$, $5^y$ and $4^y$ by progressively increasing distances. Inasmuch as the preliminary tool Y is provided with an inclined cutting face having the same degree of inclination as the helicoidal cutting faces of the teeth of the final cutter A and is provided with the same degree of relief as the teeth of the final cutter the extent of distortion is the same as that of the cutter A at an axial plane of intersection.

The preliminary cutter Y is used to cut the intermediate tool W, as shown in Fig. 12, providing the said tool at its cutting face 21 with a distorted contour which is the same as the effective contour of the cutter Y shown by full lines in Fig. 14. This distorted contour is illustrated in the plan view in Fig. 15, the contour having points $14^w$, $15^w$, $16^w$, $17^w$ and $18^w$ corresponding respectively to the points $14^y$, $15^y$, $16^y$, $17^y$ and $18^y$ of the effective contour of the cutter Y. It will be observed that the tool W is formed without relief, it being fed perpendicularly to its cutting face 21, as indicated by the arrow in Fig. 12.

The intermediate tool W is used, as shown in Fig. 16, for cutting a lathe tool X. The tool X has a cutting face 22 and has its front face 23 inclined with respect to the cutting face to provide the necessary relief. The tool W is set with its cutting face 21 parallel with the cutting face 22 of the tool X, and relative reciprocation is then effected along lines parallel with the front face 23. The result is that the cutting face 22 is formed with a distorted contour which is exactly the same as the distorted contour of the face 21 of the tool W. This distorted contour is shown in Fig. 17 and it has points $14^x$, $15^x$, $16^x$, $17^x$ and $18^x$ corresponding respectively to the points $14^w$, $15^w$, $16^w$, $17^w$ and $18^w$ of the cutter W.

Fig. 18 shows the tool X being used for shaping the cutter A. It will be understood that the blank is rotated as indicated by the arrow and that the tool X is moved inward and outward in timed relation to the rotation to provide relief. The distortion of the shape of the tool X is just sufficient to offset the distortion which would otherwise take place in the cutter A, and the result is that the cutter A is formed with the correct effective contour.

While not herein specifically shown, it is possible by reason of the use of the lathe tool X to make a cutter having parts of its contour sharply inclined with respect to the axis, and having the outer surface of each tooth extending backward toward the next following tooth to an extent beyond that to which it could be cut by a preliminary shaped milling cutter. A cutter of this type is set forth in my copending application for milling cutters, Serial No. 368,928, filed March 26th, 1920.

If preferred there can be variation from the preliminary tool Y as shown in Figs. 12 and 13. The degree of inclination of the cutting face can be increased or decreased as desired and the degree of relief correspondingly decreased or increased. In Figs. 19 and 20 I have shown a tool Z similar to the tool Y but having its top cutting face 24 provided with a degree of inclination one-half that of the top cutting face 19 of the tool Y. The rise is $j$, which is one-half of the rise $f$ of the cutter A. Correspondingly the degree of relief of the front face 25 is twice that of the front face 20 of the tool Y. The clearance $k$ is twice the clearance $j$ of the tool Y, the angle $l$ being correspondingly greater than the angle $i$. As the result of the lesser inclination of the cutting face 24 and the greater inclination of the front face 25 the tool Z is given a distorted effective contour $14^x$, $15^x$, $16^x$, $17^x$, $18^x$, which is exactly the same as the effective contour $14^y$, $15^y$, $16^y$, $17^y$, $18^y$, of the tool Y as shown by full lines in Fig. 14.

The tool Z is used to make the tool W, exactly as the tool Y is used, as shown in Fig. 16, the tool W being given exactly the same contour. The tool W can then be used as before described, the subsequent steps being as shown in Figs. 16 to 18.

What I claim is:

1. The herein described method of shaping a relieved milling cutter adapted to cut a predetermined contour other than a straight line and having cutting faces inclined with respect to the axis, the method consisting in forming a reciprocable preliminary tool having the correct predetermined contour at planes of intersection transverse to the lines of cutting and provided with a cutting face with a degree of inclination bearing a predetermined ratio to the degree of inclination of the cutting faces of the final cutter and provided with a degree of relief bearing a ratio to the degree of relief of the teeth of the final cutter which is the inverse of the ratio between the degrees of inclination, and in forming the shape of the relieved final milling cutter from the said reciprocable preliminary tool whereby the final cutter is formed with a distorted shape at axial planes of intersection but is adapted to cut the correct contour when rotated.

2. The herein described method of shaping a relieved milling cutter adapted to cut a predetermined contour other than a straight line and having cutting faces inclined with respect to the axis, the method consisting in forming a reciprocable preliminary tool having the correct predetermined contour at planes of intersection transverse to the lines of cutting and provided with a cutting face with a degree of inclination bearing a predetermined ratio to the degree of inclination of the cutting faces of the final cutter and provided with a degree of relief bearing a ratio to the degree of relief of the teeth of the final cutter which is the inverse of the ratio between the degrees of inclination, in forming a lathe tool from the said preliminary tool, and in cutting the relieved final milling cutter by means of the said lathe tool whereby the final cutter is formed with a distorted shape at axial planes of intersection but is adapted to cut the correct contour when rotated.

3. The herein described method of shaping a relieved milling cutter adapted to cut a predetermined contour other than a straight line and having cutting faces inclined with respect to the axis, the method consisting in forming a reciprocable preliminary tool having the correct predetermined contour at planes of intersection transverse to the lines of cutting and provided with a cutting face with a degree of inclination the same as the degree of inclination of the cutting faces of the final cutter and provided with a degree of relief the same as the degree of relief of the teeth of the final cutter, in forming a lathe tool from the said preliminary tool, and in cutting the relieved final milling cutter by means of the said lathe tool whereby the final cutter is formed with a distorted shape at axial planes of intersection but is adapted to cut the correct contour when rotated.

4. The herein described method of shaping a relieved milling cutter adapted to cut a predetermined contour other than a straight line and having cutting faces inclined with respect to the axis, the method consisting in forming a reciprocable preliminary tool having the correct predetermined contour at planes of intersection transverse to the lines of cutting and provided with a cutting face with an angle of inclination the same as the angle of inclination of the cutting faces of the final cutter at the outside radius thereof and provided with a relief angle the same as the relief angle of the teeth of the final cutter at the outside radius thereof, in forming a lathe tool from the said preliminary tool, and in cutting the relieved final milling cutter by means of the said lathe tool whereby the final cutter is formed with a distorted shape at axial planes of intersection but is adapted to cut the correct contour when rotated.

5. The herein described method of shaping a relieved milling cutter adapted to cut a predetermined contour other than a straight line and having cutting faces inclined with respect to the axis, the method consisting in forming a reciprocable preliminary tool having the correct predetermined contour at planes of intersection transverse to the lines of cutting and provided with a cutting face with a degree of inclination bearing a predetermined ratio to the degree of inclination of the cutting faces of the final cutter and provided with a degree of relief bearing a ratio to the degree of relief of the teeth of the final cutter which is the inverse of the ratio between the degrees of inclination, in cutting an intermediate tool with the said preliminary tool, in cutting a lathe tool with the intermediate tool, and in cutting the relieved final milling cutter by means of the said lathe tool whereby the final cutter is formed with a distorted shape at axial planes of intersection but is adapted to cut the correct contour when rotated.

In testimony whereof I hereto affix my signature.

FRIEDERICH MÜLLER.